(12) United States Patent
Elnozahy

(10) Patent No.: US 7,203,722 B2
(45) Date of Patent: Apr. 10, 2007

(54) OPTIMISTIC PROCESSING OF NETWORK FRAMES TO REDUCE LATENCY

(75) Inventor: Elmootabellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 09/864,138

(22) Filed: May 24, 2001

(65) Prior Publication Data

US 2002/0178068 A1    Nov. 28, 2002

(51) Int. Cl.
*G06F 15/16* (2006.01)

(52) U.S. Cl. ............... 709/203; 709/208; 709/219; 709/226; 709/236; 709/250; 370/230; 370/235

(58) Field of Classification Search ........... 709/236, 709/201–203, 208–210, 217–219, 226, 229–230, 709/250; 370/229–231, 235
See application file for complete search history.

(56) References Cited

U.S. PATENT DOCUMENTS

| | | | | |
|---|---|---|---|---|
| 5,119,478 A | * | 6/1992 | Calvignac et al. | 709/236 |
| 5,784,622 A | * | 7/1998 | Kalwitz et al. | 710/200 |
| 5,845,085 A | * | 12/1998 | Gulick | 709/236 |
| 6,011,803 A | * | 1/2000 | Bicknell et al. | 370/467 |
| 6,034,963 A | * | 3/2000 | Minami et al. | 370/401 |
| 6,173,333 B1 | * | 1/2001 | Jolitz et al. | 709/240 |
| 6,246,683 B1 | * | 6/2001 | Connery et al. | 370/392 |
| 6,336,140 B1 | * | 1/2002 | Elgressy et al. | 709/224 |
| 6,363,444 B1 | * | 3/2002 | Platko et al. | 709/208 |
| 6,389,479 B1 | * | 5/2002 | Boucher et al. | 709/243 |
| 6,427,173 B1 | * | 7/2002 | Boucher et al. | 709/238 |
| 6,483,840 B1 | * | 11/2002 | Vogel | 370/401 |
| 6,549,934 B1 | * | 4/2003 | Peterson et al. | 709/203 |
| 6,625,650 B2 | * | 9/2003 | Stelliga | 709/226 |
| 6,658,480 B2 | * | 12/2003 | Boucher et al. | 709/239 |
| 6,671,259 B1 | * | 12/2003 | He et al. | 370/235 |
| 6,678,746 B1 | * | 1/2004 | Russell et al. | 710/1 |
| 6,687,833 B1 | * | 2/2004 | Osborne et al. | 713/201 |
| 6,731,644 B1 | * | 5/2004 | Epps et al. | 370/412 |
| 6,742,066 B2 | * | 5/2004 | Emerson et al. | 709/219 |
| 6,757,744 B1 | * | 6/2004 | Narisi et al. | 709/250 |
| 6,757,746 B2 | * | 6/2004 | Boucher et al. | 709/250 |

\* cited by examiner

*Primary Examiner*—Bharat Barot
(74) *Attorney, Agent, or Firm*—Casimer K. Salys; Dillon & Yudell LLP

(57) ABSTRACT

A system and method in which the server device processes the lower level layers, referred to herein as the "network portion", of a frame substantially in parallel with the processing of the application portion of the frame. The application portion of the frame, which may include an HTTP request is forwarded to the server application such as a web server, while the network portion of the frame is processed. If the processing of the network portion determines that the frame was mis-delivered or is corrupted, the response to the HTTP request is aborted, otherwise the response is processed and returned to the client. By optimistically assuming that the request was delivered correctly, the present invention leverages the parallel processing capabilities available on many server appliances and improve response time without incurring any substantial performance penalty.

14 Claims, 2 Drawing Sheets

OPTIMISTIC PROCESSING OF NETWORK FRAMES TO REDUCE LATENCY

BACKGROUND

1. Field of the Present Invention

The present invention relates to the field of data processing networks and more particularly to the processing of frames received by a server on the network.

2. History of Related Art

In the field of data processing networks, the client-server model is well known. In a client-server model, the client may comprise an application such as a conventional web browser running on any manner of computing device connected to a network such as the Internet. The client device may be a desktop or laptop personal computer, a network computer, an Internet enabled phone or personal digital assistant (PDA), and so forth. The server may comprise an application such as a web server application running on a second computing device (or set of computing devices) such as a server appliance that is also connected to the network. In a typical client server transaction or session, the client initiates a request for information that is delivered to the server over the network. As is well known, the request may travel over the network as one or more frames of information formatted according to a network protocol supported by both the client and server. Typically, the formatting of frames according to a network protocol includes appending one or more frame headers onto the data (or a portion thereof) representing the request at the client end. The number of frame headers appended onto a request may vary dependent upon the particular network protocol in use. The Open System Interconnection (OSI) Model defines seven layers that describe how applications running on network-aware devices communicate with each other. A network frame may include a header corresponding to each of these layers (except perhaps the physical layer). When a frame arrives at its destination, the server device processes the header information prior to delivering the application data to the server application.

Among the most prevalent type of client-server communication is a Hypertext Transfer Protocol (HTTP) formatted request delivered to a server over a Transmission Control Protocol/Internet Protocol (TCP/IP) compliant network. The TCP/IP suite of protocols is the basic communication language of many networks including the Internet. For more information regarding TCP/IP, the reader is directed to M. Murhammer et al., *TCP/IP Tutorial and Technical Overview*, available online at www.redbooks.ibm.com (#GG24-3376-05) and incorporated by reference herein. When an HTTP request is received at the server end, the lower level headers including the IP header and the TCP header are processed to verify, among other things, that the frame has arrived at the correct destination and has not been corrupted during transmission over the network. When the lower level headers have been processed, the HTTP request is passed to a web server to process the actual request. Thus, the delivery of the request to the server application is typically delayed until the network headers are processed. It would be desirable to implement a method and system that reduced or eliminated this delay in an effort to improve network performance.

SUMMARY OF THE INVENTION

The problems identified above are in large part addressed by a system and method in which the server device processes the lower level headers (referred to herein as the "network portion") of a frame substantially in parallel with the processing of the application portion of the frame. The application portion of the frame, which may include an HTTP request is forwarded to the server application such as a web server, while the network portion of the frame is processed. If the processing of the network portion determines that the frame was mis-delivered or is corrupted, the response to the HTTP request is aborted, otherwise the response is processed and returned to the client. By optimistically assuming that the request was delivered correctly, the present invention leverages the parallel processing capabilities available on many server appliances and improve response time without incurring any substantial performance penalty.

BRIEF DESCRIPTION OF THE DRAWINGS

Other objects and advantages of the invention will become apparent upon reading the following detailed description and upon reference to the accompanying drawings in which.

Figure 1:
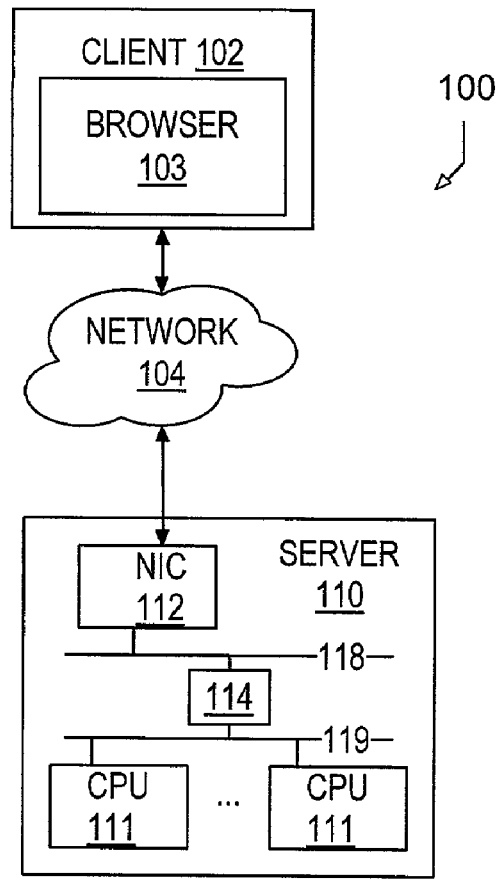
FIG. 1 is a block diagram of selected portions of a data processing network suitable for use in conjunction with the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 depicts selected features of a data processing network 100 according to one embodiment of the present invention. Portions of the network and systems described herein may be implemented as a set of computer executable instructions (computer software). For such portions, the instructions may reside on any suitable computer readable memory or storage facility. During execution of the instructions, for example, the software, or portions thereof, may reside in the system memory (RAM) or cache memory of a data processing device. At other times, the software be stored on a permanent or quasi-permanent storage facility such as a hard disk, floppy diskette, VD ROM, DVD, magnetic tape or other suitable storage facility. In the embodiment depicted in FIG. 1, network 100 includes a client device 102 connected to a network 104. Client device 102 may be implemented as substantially any network-aware data processing device including, as examples, desktop and laptop personal computers, workstations, network computers, internet enabled phones and PDA's, etc.

Client device 102 includes a client application program that enables client device 102 to communicate with other devices connected to the network. In one embodiment, the client application program is a conventional web browser indicated in FIG. 1 by reference numeral 103. Using browser 103, a user of client 102 can initiate requests for information from other network devices. A common example of a request for information is an HTTP GET request that occurs when the user specifies a Universal Resource Locator (URL) through browser 103.

The GET request, or any other request for information initiated by a user of browser 103, is formatted according to the network protocol by the operating system and/or firmware of client device 102 and delivered to network 104 typically via a network interface card (not shown). Network 104 may represent a private, local area network such as an Ethernet network or a wide area network such as the Internet.

Figure 2:
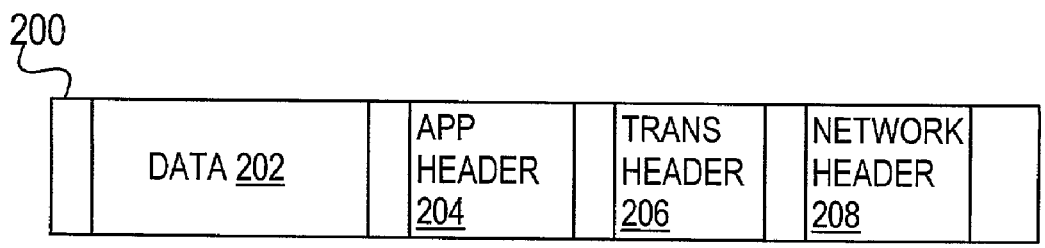
FIG. 2 is a conceptualized illustration of a network frame.

Referring to FIG. 2, a conceptualized representation of a frame 200 suitable for transmission over an OSI model compliant network 104 is presented. As illustrated, frame 200 includes a data field 202 (also referred to as a payload) an application layer header 204, a transport layer header 206, and a network layer header 208. Specific implementations of network 104 may require additional headers as well. In an embodiment in which network 104 is a TCP/IP network, such as the case in which network 104 represents the Internet, the transport layer header 206 represents the TCP header, and the network layer 208 represents the IP header. If the frame is issued as part of a web based request from web browser 102, the request is likely an HTTP formatted request in which case the application layer header 204 of frame 200 is an HTTP header.

Returning now to FIG. 1, a server device 110 that is the target of the request initiated by client 102 is also connected to network 104. Typically, server device 110 includes a network interface card (NIC) 112 connected to one or more central processing units (CPUs) 111 through a intermediate host bus 119 to which CPUs 111 are connected, a host bus bridge 114, and a peripheral bus 118, such as a PCI bus, to which NIC 112 is connected. In one embodiment, NIC 112 includes its own special purpose or embedded processor to enable NIC 112 to perform some local processing of network frames.

For embodiments of service device 110 that include multiple processors 111 or that include a NIC 112 with sufficient processing capability, server device 110 possesses the ability to simultaneously perform at least two processes. Generally speaking, the invention contemplates using the processing capability of multi-processors servers and/or servers with network cards containing hardware-assist to reduce latency in responding to web based or other network requests.

Figure 3:
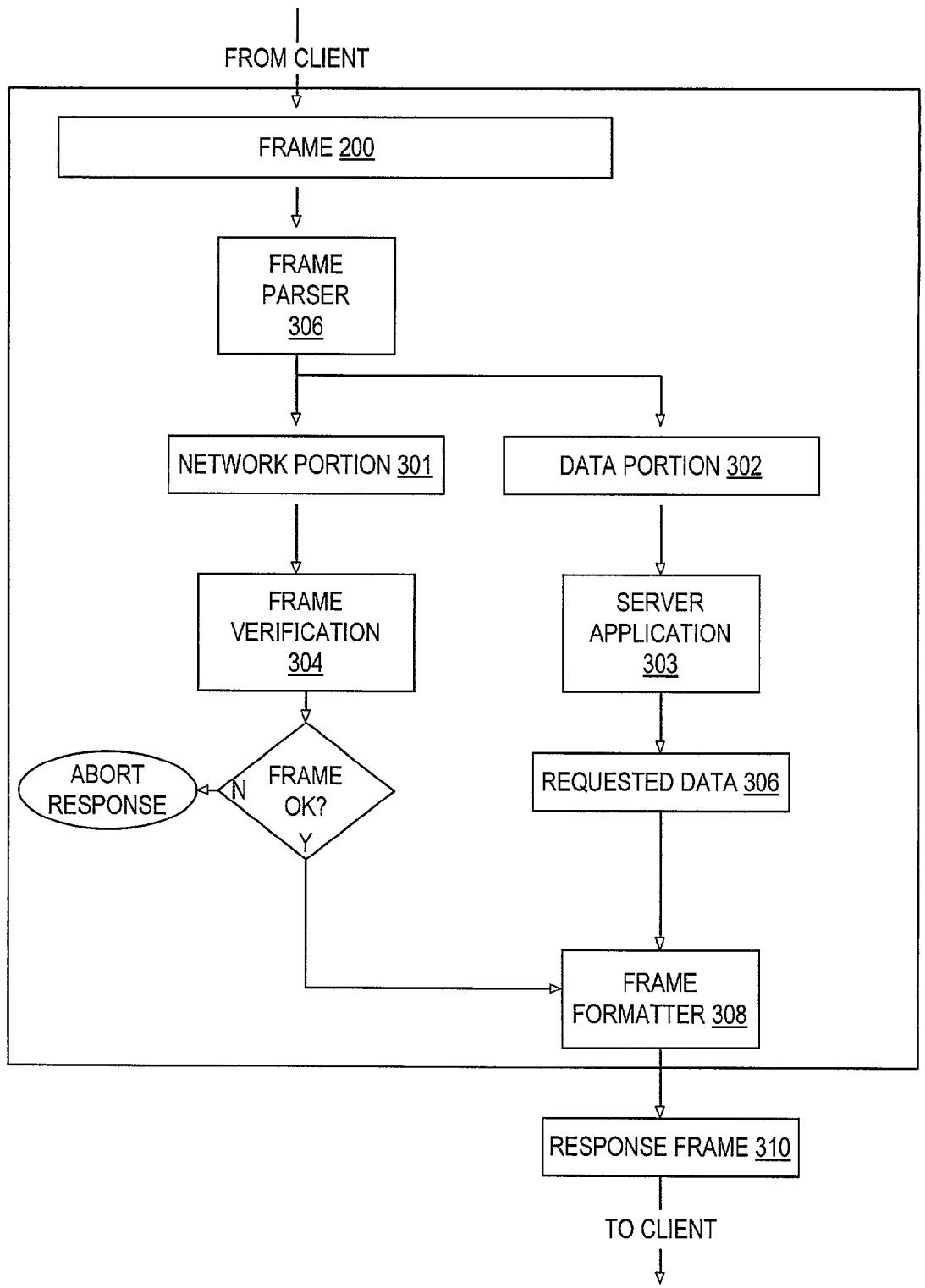
FIG. 3 is a block diagram of a system and method for processing client request in a data processing network according to one embodiment of the invention.

Referring now to FIG. 3, an illustration of the operation of server device 110 in responding to a client initiated request for information is depicted. In the depicted embodiment, a frame 200 representing a client initiated request, or a portion thereof, is indicated as arriving at server device 110 presumably via NIC 112. NIC 112 preferably includes sufficient processing capability and firmware to perform local processing of frames 200 received from network 104.

Upon receipt by server device 110 and NIC 112, frame 200 is initially provided to a frame parser 306. Frame parser 306 may comprise firmware, software, or hardware implemented on NIC 112. Alternatively, frame parser 306 may comprise software executed by one of the multiple processors 111 in a multiprocessor implementation of server 110. In either case, frame parser 306 is responsible for defining a first portion of frame 200, referred to herein as the network portion 301, and a second portion of frame 200 referred to herein as the data portion 302. As their names suggest, network portion 301 of frame 200 includes the network relevant information such as the network layer header 208 and the transport layer header 206 while the data portion 302 of frame 200 includes the request relevant information including the application layer header 204 and any data 202. In addition, network portion 301 may include part or all of data portion 302 or even the entire frame 200 in an embodiment where the error checking mechanism relies upon the frame as whole.

In a TCP/IP network environment in which server 110 is handling web-base requests, the network portion 301 of frame 200 includes the TCP and IP headers. The IP header information is used to determine, among other things, whether frame 200 arrived at the correct destination (i.e., was the frame properly routed over network 104). The TCP header information is used to ensure the integrity and reliability of the frame. Although processing these header can require an appreciable amount of time, such as the time required to perform a full ECC check of frame 200, frame parser 306 can delineate relatively quickly the network portion 301 from the data portion 302.

Network portion 301 of frame 200 is then provided to a frame verifier represented in FIG. 3 by reference numeral 304. Frame verification 304 may exist as software or firmware on NIC 112. The frame verification 304 may include processing the network layer header 208 and a transport layer header 206 of a frame 200 to determine if the frame 200 is in the proper location and whether it contains any errors.

Simultaneously with the processing of network portion 301 of frame 200 in the frame verification unit 304, the data portion 302 of frame 200 is being processed by the server application. In an embodiment in which server device 110 is servicing web-based requests, server application 303 may represent a web server that interprets HTTP formatted Hypertext Markup Language (HTML) code. Typically, server application 303 will be responsible for retrieving data from a storage facility such as a hard disk in response to the client initiated request. Typically, the retrieval of this information is unaffected by the network portion information and can therefore proceed in parallel with the processing of network information 301. Ultimately, server application 303 produces requested data 306 responsive to the client request and forwards requested data 306 to a frame formatter 308.

In the depicted embodiment, the frame verification unit 304 acts as an enable for frame formatter 308. More specifically, if the frame verification unit 304 determines that the frame 200 received by server device 110 is reliable, the verification unit permits frame formatter 308 to initiate the process of formatting the requested information suitable for transmission across the network. If frame verification unit 304 detects an error condition of some sort, further processing of the request data is terminated.

If the received frame 200 is verified as reliable, frame formatter 308 is responsible for formatting the requested data 308 into protocol compliant frames suitable for transmission across network 104 back to the requesting client 102. By optimistically assuming that the received frame 200 is reliable (contains no errors and is appropriately routed) the invention reduces latency by trading incurring the relatively small delay required to parse the frame in exchange for the ability to process the network information and the request information simultaneously. Since the majority of frames are presumed to be reliable even in an Internet application, the tradeoff will effectively reduce latency and improve performance.

It will be apparent to those skilled in the art having the benefit of this disclosure that the present invention contemplates a method and system for responding to client initiated request with reduced latency. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A data processing network, comprising:
   a client attached to the network and configured to issue a request for data over the network; and
   a server attached to the network and configured to receive the request, to server including:
      a parser configured to identify a network portion of the request and a data portion of the request;
      a verifier configured to receive the network portion of the request identified by the parser and, responsive thereto, to verify the integrity of the request;
      an application program configured to receive the data portion of the request identified by the parser and, responsive thereto, to retrieve the requested data; and
      wherein the server is configured to execute the parser and the application program simultaneously and further wherein the server is configured to abort the retrieval of the requested data responsive to detecting a fault in the network portion
      wherein the data portion comprises the application layer header of the request and the data;
      wherein the server includes a network interface card with an embedded processor, and wherein the verifier executes on the embedded processor while the application program executes on a server processor.

2. The system of claim 1, wherein the application layer header comprises an HTTP header.

3. The system of claim 1, wherein the request for data comprises a TCP/IP formatted request.

4. The system of claim 3, wherein to network portion includes the TCP and IP headers of the request.

5. A network server attached to a network and configured to receive a request from a client over the network, the server comprising:
   a parser configured to identify a network portion of the request and a data portion of the request;
   a verifier configured to receive the network portion of the request identified by the parser and, responsive thereto, to verify the integrity of the request;
   an application program configured to receive the data portion of the request identified by the parser and, responsive thereto, to retrieve the requested data;
   wherein the server is configured to execute the parser and the application program simultaneously and further wherein the server is configured to abort the retrieval of the requested data responsive to detecting a fault in the network portion;
   wherein the network portion includes the TCP and IP headers of the request; and
   wherein the data portion comprises the application layer header of the request and the data
   wherein the server includes a network interface card with an embedded processor, and wherein the verifier executes on the embedded processor while the application program executes on a server processor.

6. The server of claim 5, wherein the application layer header comprises an HTTP header.

7. The server of claim 5, wherein the request for data comprises a TCP/IP formatted request.

8. A network server for processing an HTTF request being received from a client connected to a network, comprising:
   a network interface card connected to the network;
   a frame parser on the network interface card for parsing the data request into a network portion and a data portion;
   an embedded processor means on the network interface card for verifying frames by receiving the network portion of the data request and, responsive thereto, determining whether the data request was intended for receipt by the server and whether the data request contains any errors;
   a main processor means on the saver and connected to the network interface card for receiving the data portion and, responsive thereto, retrieving the client data; and
   a control connect between the embedded processor means and the main processor means for transmitting a signal from the embedded processor means to the main processor means which terminates main processor retrieving of the client data.

9. The network server of claim 8, wherein the data portion includes an HTTP header of the request and further wherein the network portion includes the entire data request such that both the network portion and the data portion include the HTTP header.

10. A method of processing information in a computer network, comprising:
    responsive to receiving by a server a request for data from a client connected to the network, parsing the request into a network portion and a data portion;
    processing, using unconditionally a processor embedded on a network interface card of the server, the network portion to verify the integrity of the request while processing, using unconditionally a server processor, the data portion to retrieve the requested data; and
    responsive to verifying the network portion, sending the requested data to the client;
    wherein the data portion comprises the application layer header of the request and the data.

11. The method of claim 10, wherein the application layer header comprises an HTTP header.

12. The method of claim 10, further comprising, responsive to detecting a fault in the network portion, aborting the request.

13. The method of claim 10, wherein the request for data comprises a TCP/IP formatted request.

14. The method of claim 13, wherein the network portion includes the TCP and IP headers of the request.

* * * * *